United States Patent [19]
Helmus

[11] Patent Number: 5,141,540
[45] Date of Patent: Aug. 25, 1992

[54] LOW-PROFILE FILTRATION MODULE

[75] Inventor: Martin C. Helmus, Grandville, Mich.

[73] Assignee: Clestra Comp-Aire Systems, Inc., Grand Rapids, Mich.

[21] Appl. No.: 833,778

[22] Filed: Feb. 11, 1992

[51] Int. Cl.⁵ .................... B01D 46/02; B01D 50/00
[52] U.S. Cl. ................... 55/385.2; 55/419; 55/472; 55/473
[58] Field of Search ............. 55/385.2, 419, 471, 55/472, 473, 487, 488, 489, 521

[56] References Cited

U.S. PATENT DOCUMENTS

| | | | |
|---|---|---|---|
| 4,471,898 | 9/1984 | Parker | 228/20 |
| 4,487,224 | 12/1984 | Parker | 137/569 |
| 4,560,395 | 12/1985 | Davis | 55/276 |
| 4,581,045 | 4/1986 | Jury | 55/419 X |
| 4,620,869 | 11/1986 | Goossens et al. | 55/385.2 |
| 4,859,140 | 8/1989 | Passadore | 415/48 |
| 5,014,608 | 5/1991 | Benson et al. | 98/33.1 |

*Primary Examiner*—Charles Hart
*Attorney, Agent, or Firm*—Waters & Morse

[57] ABSTRACT

This low-profile filtration module has a blower partially occupying an equalization chamber above a standard filter unit. A diffuser plate is interposed between the filter and the equalization chamber, and has a plurality of openings elongated in a direction perpendicular to the planes of the filter pleats. The density of the openings is increased at the portions of the equalization chamber where the space for lateral air flow is decreased by the presence of the blower.

5 Claims, 4 Drawing Sheets

LOW-PROFILE FILTRATION MODULE

BACKGROUND OF THE INVENTION

Specialized filtration equipment is commonly mounted adjacent the ceiling of so-called "clean rooms" for the removal of substantially all of the particulate contamination in the air within the room. This equipment is frequently in the form of a group of modular units, each having its own blower taking in air from above the filters, and forcing it downward through the filters and into the room. Space above the modular units is often at a premium, resulting in efforts to reduce the overall height of the units.

This effort has encountered a problem. Air must be pressurized by the blower in a chamber above the filters, and flow somehow equalized over the entire filter. The centrifugal blowers commonly used are to a large extent immersed in the equalization chamber, and produce a high-order turbulence throughout the chamber. Somehow, these horizontal turbulence velocities must be converted to uniform vertical flow with a minimum of energy loss. This is especially difficult when the immersion of the blower into the chamber reduces the vertical space available for lateral flow.

Perforated plates interposed between the equalization chamber and the top of the filter have been used for redirecting the turbulence velocities, but the known forms of these have not produced a sufficiently uniform flow within desired limits of pressure drop. Standard HEPA filter units are usually about four feet long by two feet wide, and are pleated over the top surface in a direction parallel to the shorter dimension. Diffuser plates perforated with elongated openings arranged with the length of the openings parallel to the pleats have been used with only partial success. These appear in U.S. Pat. No. 5,014,608, issued on May 14, 1991. Another form of perforated diffuser plate has a dense array of uniformly spaced small circular holes. These also have proven to be only partially satisfactory.

SUMMARY OF THE INVENTION

A filtration module embodying the present invention has a diffuser plate perforated with openings that are elongated in a direction perpendicular to the planes of the filter pleats. In the portion of the equalization chamber that is partially occupied by the blower housing, the density of the disposition of the openings is increased over that in the unobstructed chamber.

DESCRIPTION OF THE PREFERRED EMBODIMENT

Figure 1:
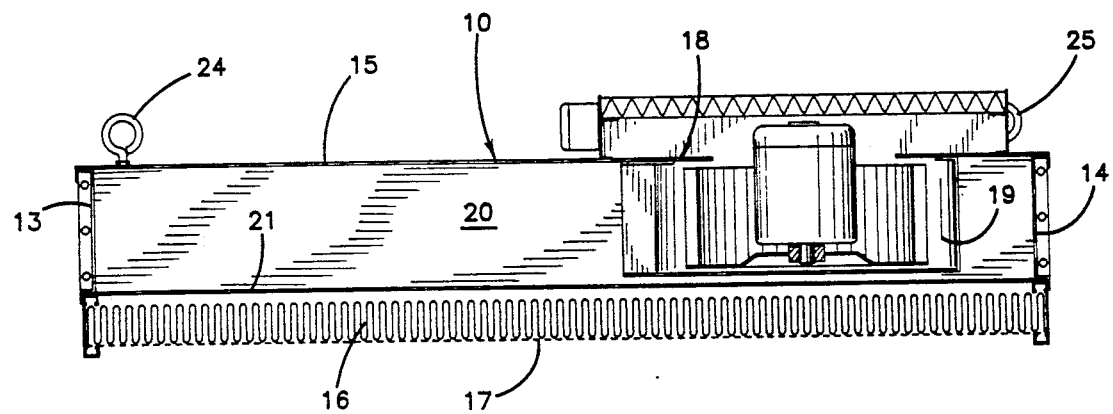
FIG. 1 is a sectional elevation of a complete filtration module assembly incorporating the present invention.
Figure 2:
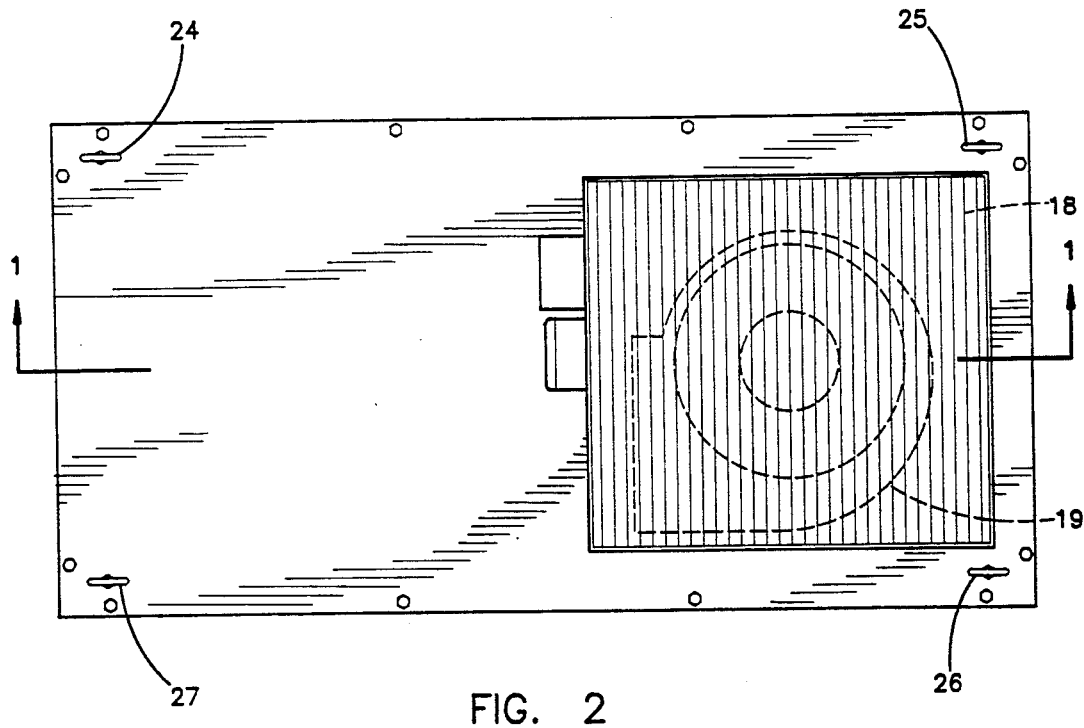
FIG. 2 is a top view of the unit shown in FIG. 1.
Figure 3:
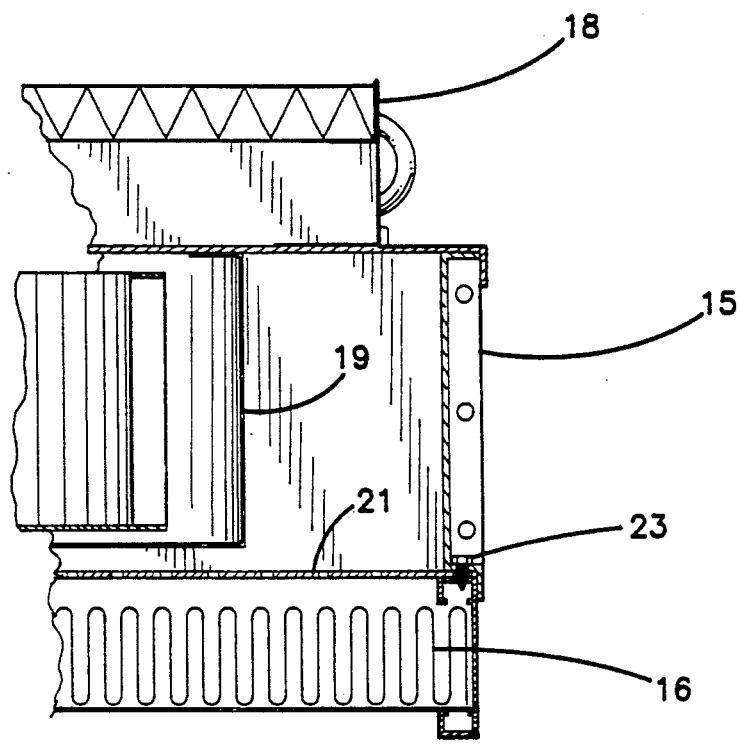
FIG. 3 is a fragmentary sectional elevation on an enlarged scale of the right-hand portion of FIG. 1.
Figure 4:
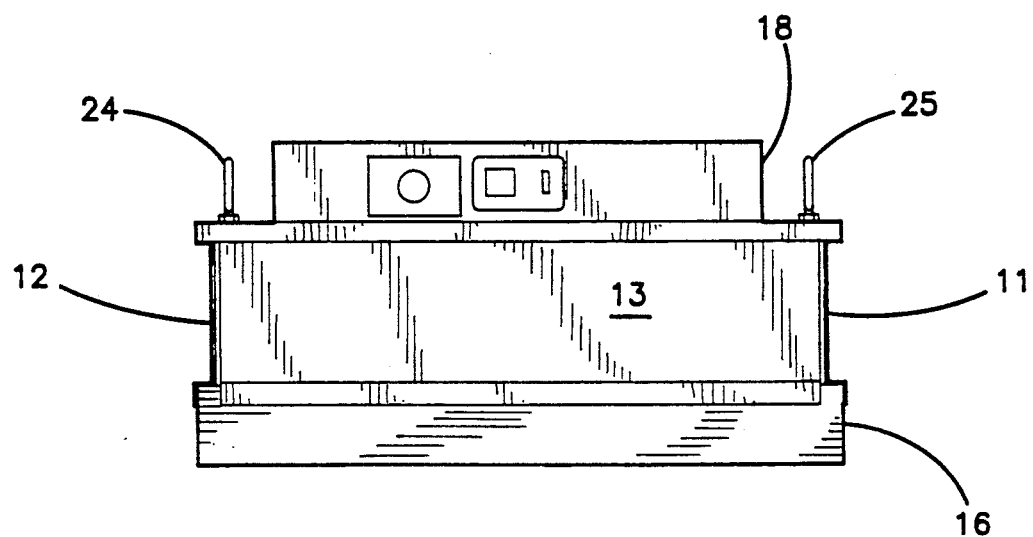
FIG. 4 is an end view with respect to FIG. 2.

Referring to FIGS. 1-4, the illustrated filtration module is built around a housing generally indicated at 10, and including the side panels 11 and 12, the end panels 13 and 14, and the top panel 15. A filter unit 16 is installed across the lower open side of the housing, which is protected by a grille 17. A standard blower 18 is installed on the right side of the top of the housing, as viewed in FIG. 2. The shroud 19 of this blower is immersed in the pressure-equalization chamber 20. A diffuser plate 21 (shown in detail in FIG. 5) separates the chamber 20 from the filter unit 16. The overall dimensions of the entire unit are approximately two feet by four feet, and the clearance between the underside of the blower and the diffuser plate is on the order of one-half inch, presenting an obvious limitation on lateral flow of air within this portion of the chamber 20.

Figure 5:
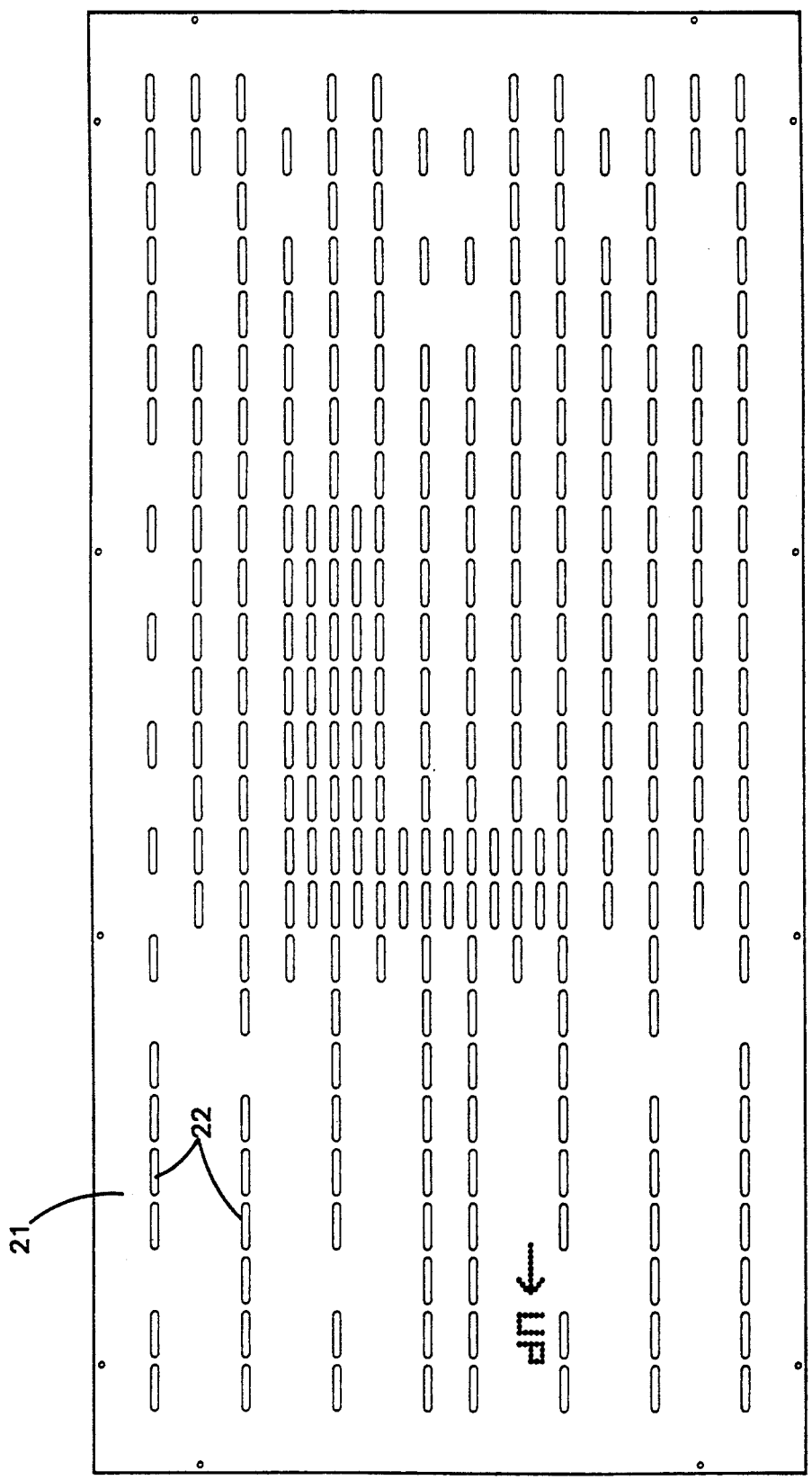
FIG. 5 is a plan view of the diffuser plate incorporated in the assembly.
Figure 6:
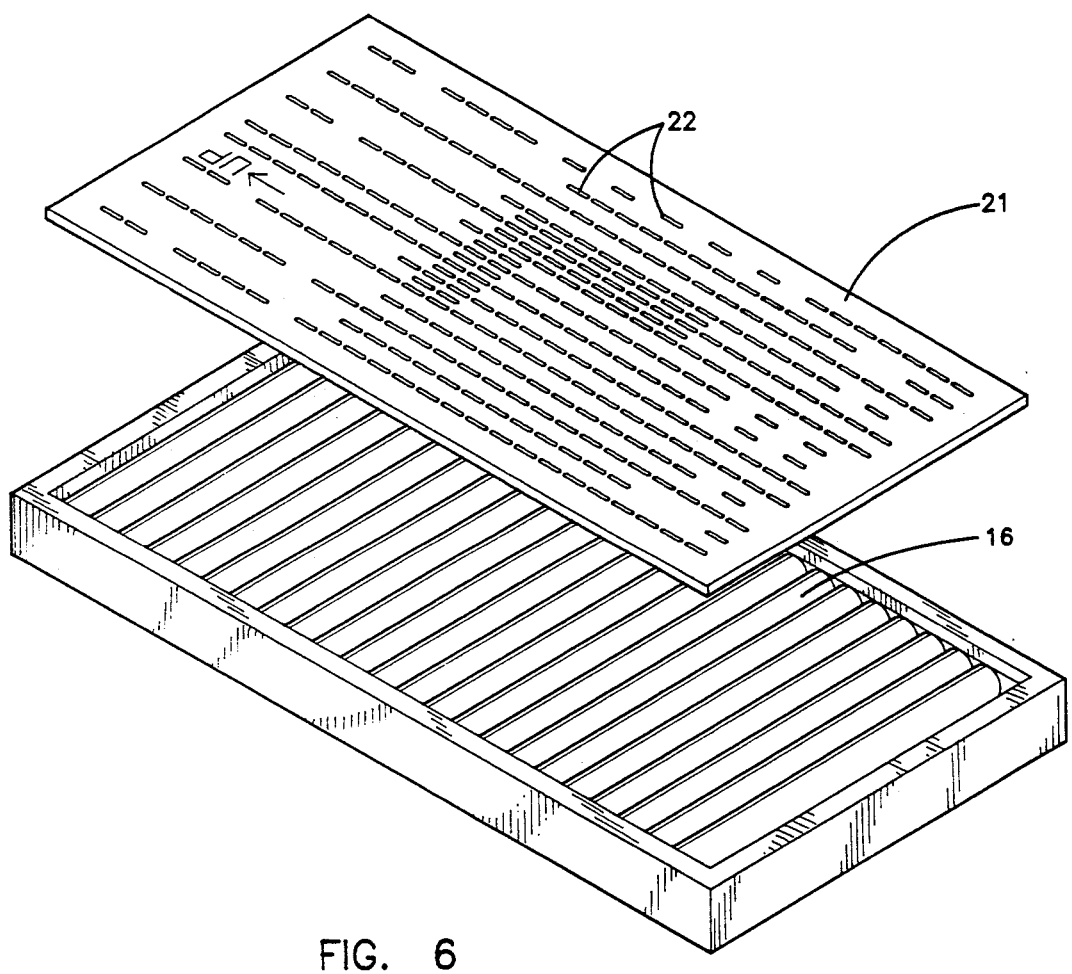
FIG. 6 is an exploded view showing the relationship of the pleated filter unit and the diffuser plate.

Referring to FIG. 5, the diffuser plate 21 is perforated with a plurality of openings 22 that are elongated in a direction parallel to the length of the diffuser plate. Referring to FIG. 6, the standard HEPA filter unit is pleated in the direction transverse to the length. The relationship between the elongated openings 22 and the pleats of the filter is that the openings are elongated in a direction perpendicular to the planes of the pleats. This has been clearly shown by experiment to produce results much superior to an arrangement in which the openings are elongated in a direction parallel to the pleats.

It should also be noted that the density of the perforations varies over the area of the diffuser plate. The turbulent high-velocity flow out of the blower tends to produce portions of the chamber 20 where the lateral swirling velocities seem reluctant to convert their energy into static pressure, and in these areas there will be a slight increase in the density of the openings 22. In the left-hand portion of the chamber 20, the turbulence patterns seem to be relatively continuous, and may be compensated for by variations in the density of the disposition of these openings. In the area underneath the blower shroud 19, the equalization problem is particularly severe. Flow in this area, however, assumes a fairly constant pattern, and can be compensated for by a considerable increase in the density of the openings in the areas that experiment establishes are most critical. This, of course, is the area appearing generally on the right side of FIG. 5, and adjacent the lateral center line of the unit. It is preferable that the openings themselves be on the order of one and a half inch in length by a quarter of an inch in width, with the ends rounded as shown. Spacing between the rows (the rows being considered in the elongated direction of the openings) is preferably in multiples of three-quarters of an inch. In a direction along the rows of openings, they are spaced apart approximately a quarter of an inch end-for-end. The plate itself is preferably of twenty gauge cold-rolled steel, and may be plated or painted for corrosion resistance. The designation "UP" appearing on the plate is done in relatively small perforations, and indicates the orientation of the plate on assembly of the unit. The plate is preferably fastened to the housing around the peripheral flange 23 (refer to FIG. 3). These fastenings can be the same that secure the filter unit to the housing 10. The entire assembly can either be placed on a network of beams suspended from the ceiling, or suspended from the eye bolts 24-27.

I claim:

1. An air filtration module including a housing providing a receptacle for a standard replaceable filter unit having pleats in the upper surface thereof, and a pressure chamber normally above said receptacle, and also including a perforated diffuser plate interposed between said pressure chamber and receptacle, and blower means having a discharge opening into said pressure chamber, wherein the improvement comprises:

a configuration of said diffuser plate, wherein a plurality of perforations are provided which are elongated in a direction transverse to said pleats.

2. A module as defined in claim 1, wherein said perforations are disposed in a pattern of differential density between various parts of said plate, said pattern being selected to establish substantially equal flow into said filter unit over its entire upper surface, and compensate for the effects of flow patterns and constrictions within said pressure chamber.

3. A module as defined in claim 1, wherein said perforations are each between three sixteenths and one half an inch in width, and between one and two inches in length.

4. A module as defined in claim 3, wherein said perforations are arranged in parallel rows, and said differential density is provided by variations in the number of said perforations in said rows.

5. A module as defined in claim 1, wherein said blower means has a shroud extending into said pressure chamber and establishing a portion of decreased space above said diffuser plate, said perforations being disposed at increased density opposite said decreased space.

* * * * *